March 18, 1947.  R. H. HASLER  2,417,647
NON-ICING PROPELLER
Filed Nov. 4, 1943  3 Sheets-Sheet 2

INVENTOR.
ROBERT H. HASLER.
BY
Knight
ATTORNEYS.

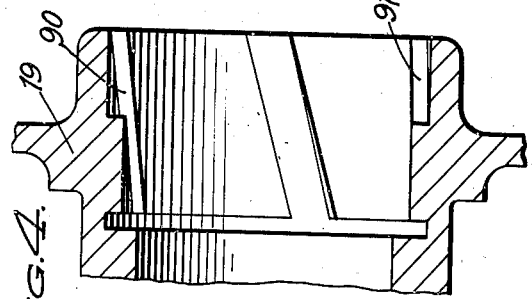
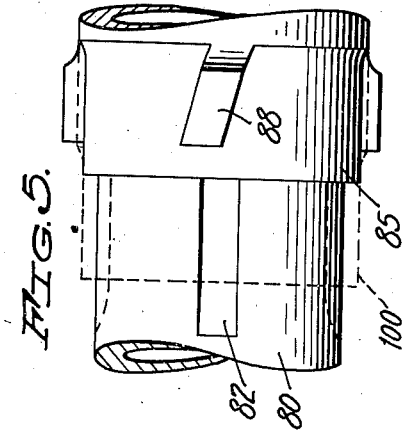
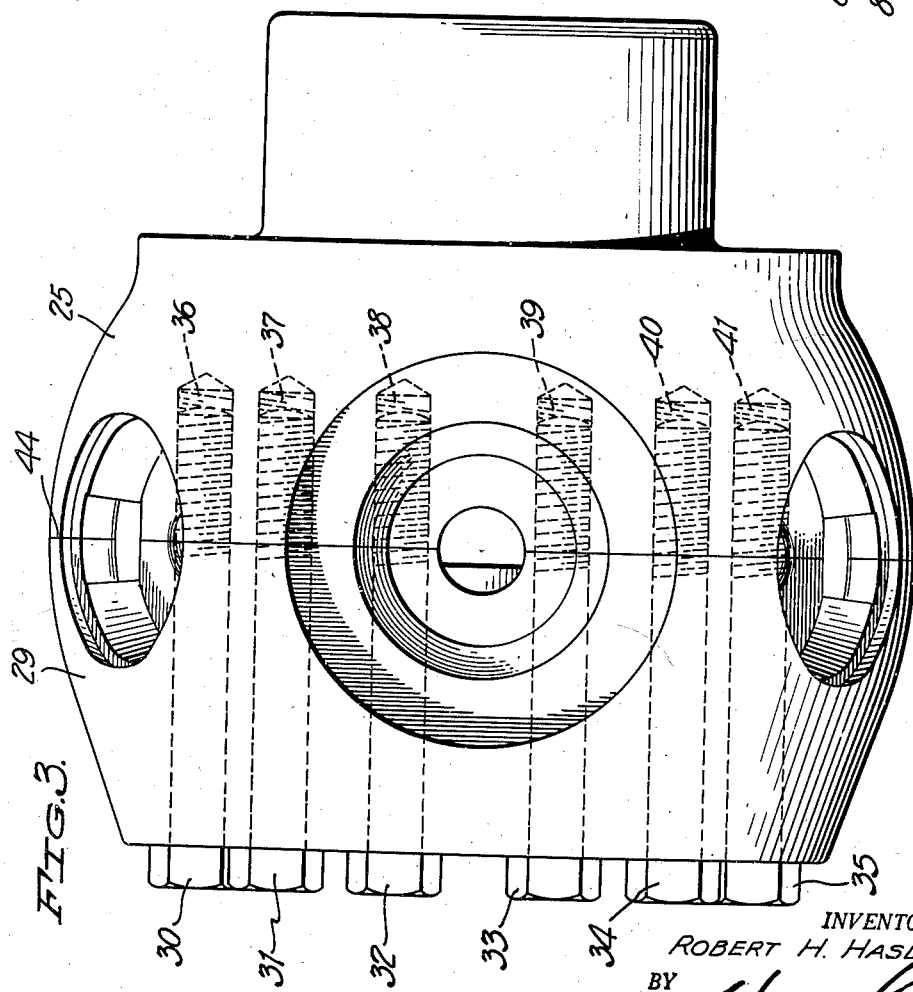

Patented Mar. 18, 1947

2,417,647

UNITED STATES PATENT OFFICE 2,417,647

NONICING PROPELLER

Robert H. Hasler, Old Westbury, N. Y.

Application November 4, 1943, Serial No. 508,886

2 Claims. (Cl. 244—134)

This invention relates to propellers intended for use on airplanes in all kinds of weather, and to an improved form of construction for protection against adverse and unfavorable atmospheric conditions.

It seeks particularly to protect the propeller from ice formations due to changes of air temperature and humidity.

While the construction may be embodied in propellers of various kinds, it is particularly applicable to the type shown in my pending patent applications entitled Aircraft propellers, filed July 29, 1943, Serial No. 496,550, and Propeller blade, filed August 5, 1943, Serial No. 497,435.

In the accompanying drawings—

Figure 3 is a top plan view of the hub housing, with parts omitted.

Figure 4 is a detail, fragmentary sectional view of a portion of the control mechanism, taken on an axial plane similar to that of Figure 1.

Figure 5 is a similar view of another portion of the control mechanism.

Figure 1:
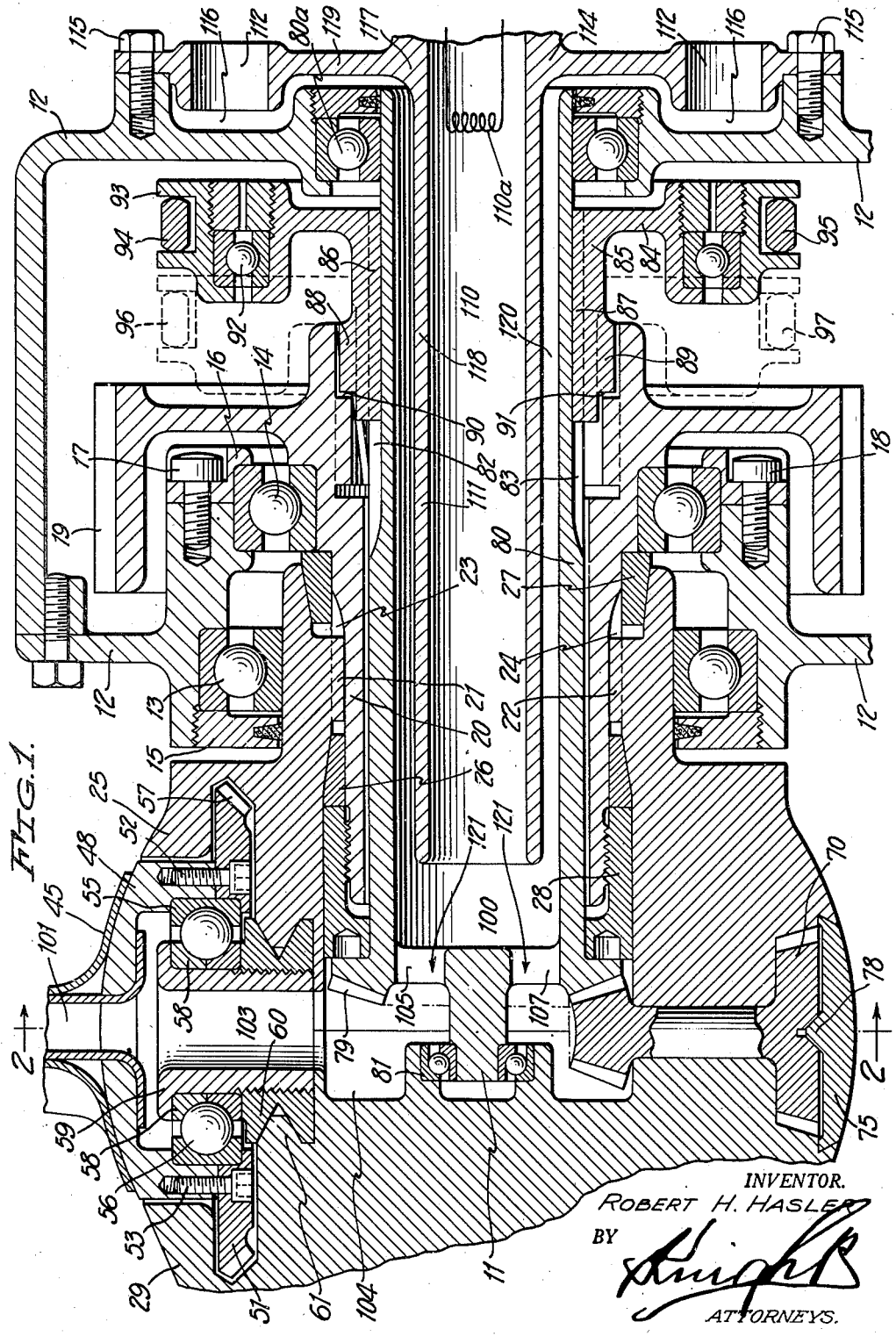
Figure 1 is a partial vertical section through the axis of the propeller hub and pitch-changing mechanism.

Referring to the drawings, Figure 1 illustrates at 12 two portions of a supporting casing within which are supported the ball bearings 13 and 14. Bearing 13 is secured in the casing by nut 15, and bearing 14 by the plate 16 and screws 17 and 18.

The casing contains an engine drive shaft and pinion, not shown. The engine pinion engages with the gear wheel 19 which is integral with the propeller drive shaft 20. The rear housing 25 is secured on the drive shaft 20 by means of splines, two of which are shown at 21 and 22. These mate with grooves 23 and 24 respectively in the bore of the rear housing. This rear housing is also secured on drive shaft 20 by the cones 26 and 27 and the retaining nut 28. The gear wheel 19 and housing 25 being thus locked together and mounted as shown, rotate as a unit on the ball bearings 13 and 14.

The housings illustrated herein are shown for a three-bladed type of propeller. The front housing 29 is bolted to the rear housing 25 by the six clamping screws 30, 31, 32, 33, 34 and 35, as clearly shown in Figure 3. These six screws pass through the front housing and are threaded into the rear housing as indicated by the dotted lines 36, 37, 38, 39, 40 and 41.

The front and rear housings meet on an abutment or divisional plane, as shown by the line 44 in Figure 3. Blade supports and pitch-changing mechanism are embedded in recesses cut in the abutment surfaces and held in place by the action of the six clamping screws.

Figure 2:
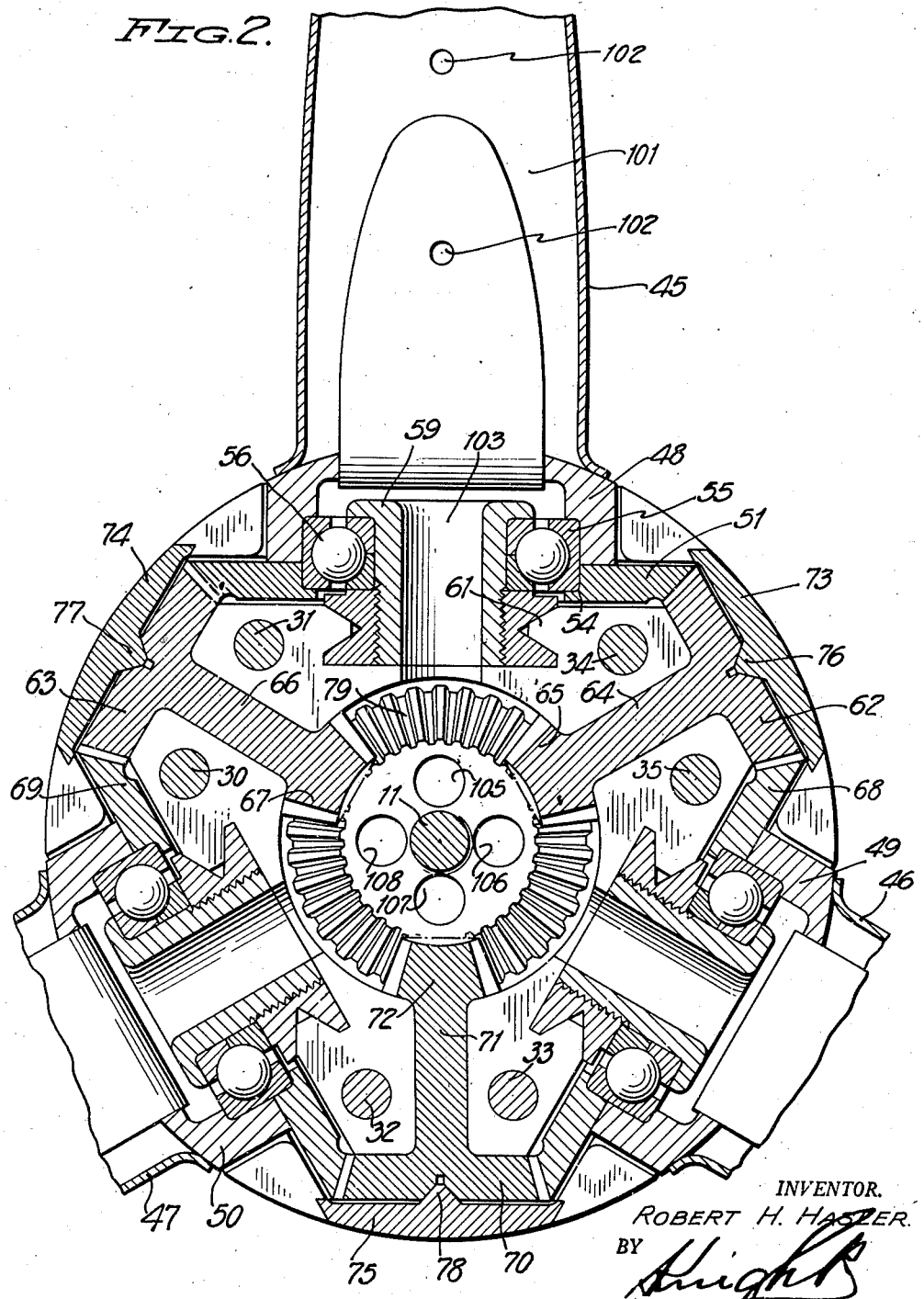
Figure 2 is a vertical section on the line 2—2 of Figure 1.

The blade supports or bases 48, 49 and 50, as shown in Figure 2, form enclosures for ball bearings, on which they are rotatably mounted, in a manner illustrated in my aforesaid application, Serial No. 496,550, and described more fully hereinafter.

The blades are of hollow construction, and parts other than the bases, comprising the radial or arm parts, are of laminated sheet metal stampings, built up and welded as shown in my application, Serial No. 497,435. Portions of these laminated blades 45, 46 and 47 are herein shown welded to bases 48, 49 and 50 respectively.

Mounting ring 51 is secured to the blade base 48 by screws, two of which are shown at 52 and 53 (Figure 1). This mounting ring serves a double purpose. As shown in Figure 2, its inner edge or shoulder 54 secures the outer race 55 of the ball bearing 56 against the shouldered inner wall of the blade base, while its outer edge forms the bevel gear teeth 57 (Figure 1). The inner races 58 of the ball bearing 56 are secured to the shouldered mounting stud 59 by the nut 60 which has a V-shaped groove extending around its periphery. This nut is secured in the front and rear housings 29 and 25 by semi-annular V-shaped tongues 61. The front and rear housings are so fitted together that the clamping screws tighten the V-shaped tongues of the housings into the groove of the nut 60 and thus provide ample support and stability for the mounting stud 59.

Similar arrangements of spherical bases, ball bearings, mounting rings, studs and nuts are provided in the hub housings for the other two propeller blades 46 and 47.

Meshed with the teeth of the mounting ring 51 are two bevel pinions 62 and 63. Pinion 62 is integral with shaft 64 and its inner bevel pinion 65. Pinion 63 is integral with shaft 66 and its inner level pinion 67. Pinions 62 and 63 are also in mesh with the teeth of adjacent mounting rings 68 and 69 respectively. These latter in turn mesh with bevel pinion 70 which is integral with shaft 71 and its inner bevel pinion 72.

The recesses in the housings for these shafts and pinions are made with sufficient clearance to permit of free rotation of these parts after the clamping screws 30, 31, 32, 33, 34 and 35 are tightened.

To permit of the machining of the recesses for these parts, it is necessary to machine three other recesses that are filled by closure pieces or caps 73, 74 and 75. These pieces have bevelled edges by means of which they are held firmly in place when the clamping screws are tightened. The outer surfaces of these closure pieces conform to the spherical surfaces of the housings. I form these closure pieces integrally with conical points 76, 77 and 78 that engage with corresponding countersinks in the pinions 62, 63 and 70 respectively. These conically-pointed closure pieces thus not only fill the gaps left by the machining operations, but they also take the thrust of all six of the bevel pinions.

Pinions 65, 67 and 72 mesh with bevel gear 79 which is integral with a tubular control shaft 80 (Figure 1). The forward part of this tubular shaft 80 includes a stub end 11 and is carried by the ball thrust bearing 81 which is supported in the front housing 29. The rear end of control shaft 80 is supported in a ball bearing 80a mounted in the rear of casing 12, and is provided with two straight slots 82 and 83 cut parallel to the shaft axis, to receive the splines 86 and 87 of a control barrel 84 which carries at its forward end a cylinder 85 that slides on the shaft 80. There is thus no rotative movement between the shaft 80 and the barrel 84. The cylinder 85 also slides within the bore of the gear wheel 19. External spiral splines 88 and 89 of the barrel cylinder 85 mate with internal spiral slots 90 and 91 respectively of the gear 19, as will be understood from an inspection of Figures 1, 4 and 5. Axial movement of barrel 84 thus causes a rotative movement between the gear wheel 79 and the housing 25.

Barrel 84 carries a ball bearing 92 that supports a grooved rim 93. This part is engaged by the prongs 94 and 95 of a shift fork which is supported by the casing 12. The yoke and supports of this shift fork are of conventional type and need not be shown. Forward pressure on the shift fork to the position indicated by the dotted lines 96 and 97 will cause an angular rotation of the control shaft 80 with respect to the propeller housing. The cylinder 85 will then take the forward position indicated by the dotted line 100 in Figure 5. This rotation is transmitted by bevel gear 79 through the bevel pinions to the three mounting rings, thus changing the pitch angles of the blades.

The protection that my invention affords against icy weather conditions is obtained by the passage of hot gases into and through the interior parts of the hub and blades, as will be shown. The blades are hollow and are provided with a series of apertures so that when revolving they form a centrifugal pump that facilitates the flow of hot gases through the interior parts. The formation of ice on the hub and blades may thus be avoided by maintaining a warm condition in advance of such formation.

The source of heat (indicated diagrammatically at 110a) may be a jacket surrounding the engine exhaust pipes, or any other device for that purpose, many of which are known in the art. The blades being hollow contain interior spaces, that of blade 45 being shown at 101. These spaces communicate with the outer air through a series of holes or apertures, as mentioned. Two of these holes in blade 45 are shown at 102.

The mounting studs such as 59 are tubular and contain interior spaces 103 which communicate with space 104 between the two housings (see Figure 1). Space 104 contains the bevel gear 79 before mentioned. The web portion of this gear 79 has a suitable number of holes such as 105, 106, 107 and 108, that open into the interior space 109 of the tubular control shaft 80. This space 109 extends to the rear end of the control shaft and opens into an annular clearance space 116 on the outside of casing 12.

A heat distributor 117 includes a tubular projection 118 that extends forward into the tubular control shaft 80 from an annular supporting plate 119 secured to the rear of casing 12 by the bolts 115. The clearance space 116 above mentioned lies between the plate 119 and the casing 12. A similar clearance space 120 lies between the projecting tube 118 and the wall of the control shaft 80. The annular plate 119 may include ports 112 open to the outside air.

In the operation of my invention, heated gas or air is admitted or introduced into the interior space 110 of the heat distributor 117. It will then be drawn by suction of the propeller through the space 109, the holes 105, 106, 107, 108, the spaces 104, 103, 101, and on out through the apertures 102, thus heating the hub and blades.

The clearance spaces 116 and 120 provide for a layer of air that forms a heat insulation between the heat distributor 117 and the casing mechanism and rear hub parts. These insulating spaces reduce the amount of heat applied to the casing parts and to the rear hub parts, and increase the proportion of heat carried to the blades. If it were not for these insulating spaces, the casing and rear parts of the hub would absorb most of the heat and very little would be available for the blades. The distributor 117 acts as a by-pass or shunt to carry the heat out into the front parts of the hub and into the blades where it is most needed.

The insulating function of the clearance spaces 116 and 120 may be augmented by providing the ports 112 in the plate 119. The suction of hot gas through space 109 will cause a small supplementary suction of cold air through the ports 112 against the rear wall of casing 12 and the inner wall of control shaft 80. This effect will further insulate the casing from the hot gases entering the space 110. The path of the hot gases under propeller suction is indicated by the arrows 121. A small amount of cold air is then drawn, as stated, inwardly through the ports 112.

I claim:

1. A non-icing propeller device comprising in combination a casing, a tubular drive shaft mounted therein, a tubular heat distributor concentrically disposed within the drive shaft with an intervening air space between them, and a plate mounted on a wall of said casing and supporting said heat distributor, said plate and said wall having between them an air space communicating with the outside atmosphere and with the air space intervening between the heat distributor and the drive shaft.

2. A non-icing propeller device comprising in combination a hollow propeller blade with its interior space opening through the blade wall into the atmosphere, a tubular drive shaft, a tubular heat distributor disposed within said drive shaft with an intervening space between their walls, means for admitting air into said intervening space, means for providing a supply of warm gas within said heat distributor, hollow driving connections between said drive shaft and said propeller blade providing communication from the space within the heat distributor and the space intervening between the heat distributor and the drive shaft through said driving connections to the interior of said propeller blade, and means for mechanically rotating said drive shaft to cause rotation of said propeller blade and thereby induce a flow of the warm gas from said heat distributor and the air from the intervening space between the heat distributor and the drive shaft through said driving connections and said propeller blade into the atmosphere by the centrifugal pumping action of the rotating propeller blade.

ROBERT H. HASLER.

REFERENCES CITED

The following references are of record in the file of this patent:

UNITED STATES PATENTS

| Number | Name | Date |
|---|---|---|
| 1,899,689 | Houston | Feb. 28, 1933 |
| 1,344,661 | Strong | June 29, 1920 |
| 1,879,717 | Sikorsky | Sept. 27, 1932 |
| 1,420,619 | Barton | June 27, 1922 |
| 2,032,682 | Blanchard | Mar. 3, 1936 |
| 2,164,721 | Price | July 4, 1939 |